(12) United States Patent
Karcher

(10) Patent No.: US 10,961,880 B2
(45) Date of Patent: Mar. 30, 2021

(54) LUBRICATION CIRCUIT, PARTICULARLY IN AN AIRCRAFT ENGINE

(71) Applicant: SAFRAN AIRCRAFT ENGINES, Paris (FR)

(72) Inventor: Gabriel aloys Karcher, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 144 days.

(21) Appl. No.: 16/211,530

(22) Filed: Dec. 6, 2018

(65) Prior Publication Data
US 2019/0178119 A1 Jun. 13, 2019

(30) Foreign Application Priority Data
Dec. 8, 2017 (FR) .................................. 17 61870

(51) Int. Cl.
| | |
|---|---|
| *F01M 1/02* | (2006.01) |
| *F16N 13/22* | (2006.01) |
| *F16N 39/00* | (2006.01) |
| *F01M 5/00* | (2006.01) |
| *F01M 1/10* | (2006.01) |

(Continued)

(52) U.S. Cl.
CPC ............... *F01M 1/02* (2013.01); *B64D 33/00* (2013.01); *B64D 37/16* (2013.01); *F01D 25/20* (2013.01); *F01M 1/10* (2013.01); *F01M 5/00* (2013.01); *F02C 7/06* (2013.01); *F16H 57/045* (2013.01); *F16H 57/0441* (2013.01); *F16H 57/0471* (2013.01); *F16N 13/22* (2013.01); *F16N 29/02* (2013.01); *F16N 39/00* (2013.01); *F05D 2260/602* (2013.01); *F05D 2260/98* (2013.01); *F16N 2210/08* (2013.01); *F16N 2250/06* (2013.01); *F16N 2280/04* (2013.01)

(58) Field of Classification Search
CPC ....... F01M 1/10; F01D 25/20; F05D 2260/98; F02C 7/06; F16H 57/0441; F16H 57/045; F16N 13/22; F16N 29/02
USPC .......................................................... 184/6.11
See application file for complete search history.

(56) References Cited

U.S. PATENT DOCUMENTS

| | | | | |
|---|---|---|---|---|
| 4,511,016 A | * | 4/1985 | Doell ........................ | F16N 7/40 184/6.11 |
| 4,531,358 A | * | 7/1985 | Smith ..................... | F16N 29/02 60/39.08 |

(Continued)

FOREIGN PATENT DOCUMENTS

| | | |
|---|---|---|
| DE | 102004056295 A1 | 6/2006 |
| EP | 2107218 A2 | 10/2009 |

OTHER PUBLICATIONS

Search Report issued in French Patent Application No. 1761870 dated Jun. 28, 2018.

*Primary Examiner* — Michael R Mansen
*Assistant Examiner* — Mark K Buse
(74) *Attorney, Agent, or Firm* — Pearne & Gordon LLP

(57) ABSTRACT

A lubrication circuit comprising an oil tank (4) integrated into a first lubricated chamber (5) comprises an evacuation conduit (20) on a recovery conduit (10) from lubricated chambers of the circuit leading to the reservoir (4), opening up into an outlet (21) when an excessive pressure in the tank, that is a symptom of progressive filling, is reached. Application to aircraft engine lubrication circuits, particularly to guard against fuel leaks in the lubricant as a result of a defective heat exchanger.

8 Claims, 4 Drawing Sheets

(51) Int. Cl.

| | |
|---|---|
| *F16H 57/04* | (2010.01) |
| *F01D 25/20* | (2006.01) |
| *F16N 29/02* | (2006.01) |
| *F02C 7/06* | (2006.01) |
| *B64D 33/00* | (2006.01) |
| *B64D 37/16* | (2006.01) |

(56) References Cited

U.S. PATENT DOCUMENTS

| | | | | |
|---|---|---|---|---|
| 4,976,335 | A * | 12/1990 | Cappellato | F16N 7/40 184/6.4 |
| 2009/0078508 | A1* | 3/2009 | DeLaloye | F01D 25/20 184/6.11 |
| 2009/0101444 | A1* | 4/2009 | Alecu | F16N 39/04 184/11.2 |
| 2010/0028127 | A1* | 2/2010 | Cornet | F01D 25/20 415/1 |
| 2010/0065374 | A1* | 3/2010 | Szolomayer | F16N 39/002 184/6 |
| 2013/0319798 | A1* | 12/2013 | Sheridan | F01M 11/067 184/6.11 |

* cited by examiner

LUBRICATION CIRCUIT, PARTICULARLY IN AN AIRCRAFT ENGINE

This application claims priority from French Patent Application 17 61870 filed on Dec. 8, 2017, the entire disclosure of which is hereby incorporated by reference herein.

This invention relates to a lubrication circuit, particularly oil or possibly another liquid, in an aircraft engine.

Lubrication circuits considered particularly herein comprise a first chamber in communication with a lubricant tank of the circuit such that an overflow from the tank can flow into the first chamber. This configuration is found in some aircraft engines, in which the lubricant tank concerned herein is located inside a gearbox or other equipment of the same type (herein called first chamber), that has to be lubricated and that is therefore connected to the lubrication circuit. Tank overflows that flow into the gearbox, if any, are not a problem. However, if a large quantity of liquid appears in the circuit under circumstances that will be described later, overfilling of the gearbox that then occurs can create risks for operation of the machine, including dissemination of the lubricant towards the exterior of the lubricated chambers (herein called second chambers) and a fire risk.

In a general form, the invention relates to a lubrication circuit of a first chamber and at least one second chamber, the circuit comprising a lubricant tank, a discharge conduit from the tank into the first chamber, a lubricant recovery conduit connecting the second chamber to the tank and equipped with a pump forcing a flow towards the tank, and an outlet ventilation conduit connecting the first chamber to a medium external to the circuit; it also comprises an evacuation conduit connecting to the recovery conduit between the pump and the reservoir and leading to an outlet, the evacuation conduit being equipped with a discharge valve preventing backflows to the recovery conduit and designed to open when the pressure in the recovery conduit exceeds a predetermined overpressure threshold.

In an innovative manner, the circuit also comprises a valve on the ventilation conduit, a depressurisation conduit connected to the valve and leading to a depressurisation outlet, and a valve control conduit originating from the evacuation conduit downstream from the evacuation valve, the valve being designed to bring the ventilation conduit into communication with the depressurisation conduit when a pressure threshold is reached in the control conduit: the irruption of liquid then causes not only evacuation through the special-purpose conduit, but also depressurisation of the second chamber due to the opening of the valve.

The evacuation conduit fitted with the valve avoids excessive filling of the lubrication circuit and adjacent liquid chambers, if there should be any accidental irruption from the circuit. The selected arrangement is appreciable particularly in aircraft engines in which some events, such as an inversion of gravity affecting the system as is the case if the aircraft is upside down or in the case of an air pocket, could also be identified as being overfilling of liquid that could cause untimely opening of an evacuation device. However, the device according to the invention does not have the disadvantage that would lead to a loss of a large quantity of liquid from the circuit. The effect of evacuation is reinforced with the innovative characteristics of the invention, which not only avoids filling of the first chamber but also overpressures in the second chamber, that are equally harmful because they can lead to dangerous disseminations of oil or other liquids in other parts of the engine.

The invention is particularly useful if the circuit comprises a supply duct originating from the tank and passing through a heat exchanger through which another fluid passes: if the heat exchanger structures are perforated, the fluids are mixed with each other and if the pressure of this other fluid is higher, it will enter the lubrication circuit which will cause the unwanted excess liquid mentioned above.

Another aspect of the invention is an aircraft engine comprising the circuit according to the above, the first chamber being a gearbox and the second chamber comprising engine shaft support bearings.

In this case, the function of the planned liquid outlet is to remove excess liquid from the circuit. It may consist of a recovery box for this liquid; or in another embodiment in which it can prevent the loss of liquid that can be retained when it is predictable that this liquid will contain a fuel content, it may also consist of an evacuation to a combustion chamber of the engine.

The other fluid mentioned above for which there is a heat exchange with the lubricant can be fuel. In this case, an improvement to the invention is planned in which, in the case of a fuel irruption into the lubrication circuit, the evacuation conduit leads to a fuel tank of the aircraft to avoid the loss of an excessive quantity of fuel, for example by a release into the atmosphere. The quantity of lubricant mixed with fuel that is then released into the discharge conduit and mixed with fuel present in the tank, will then probably be too small to harm correct operation of the engine.

The invention will now be described with reference to the following figures.

Figure 5:
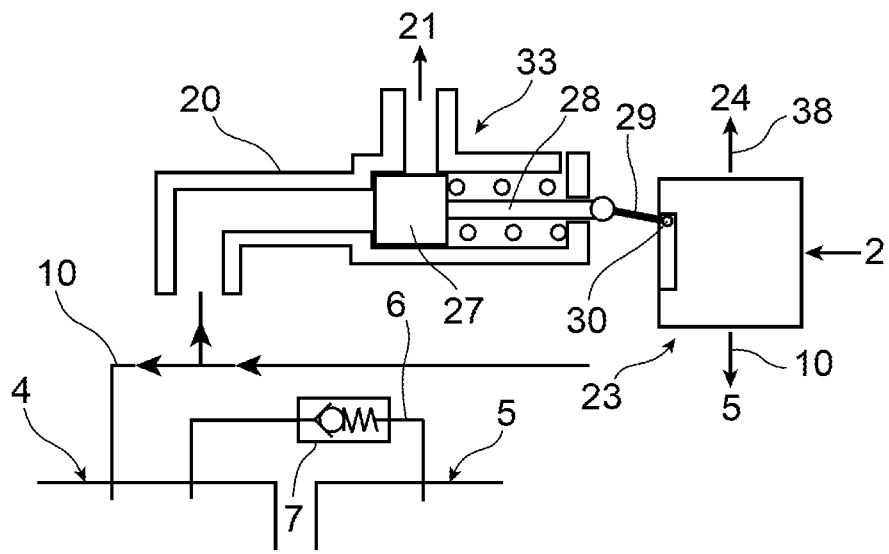
Figure 6:
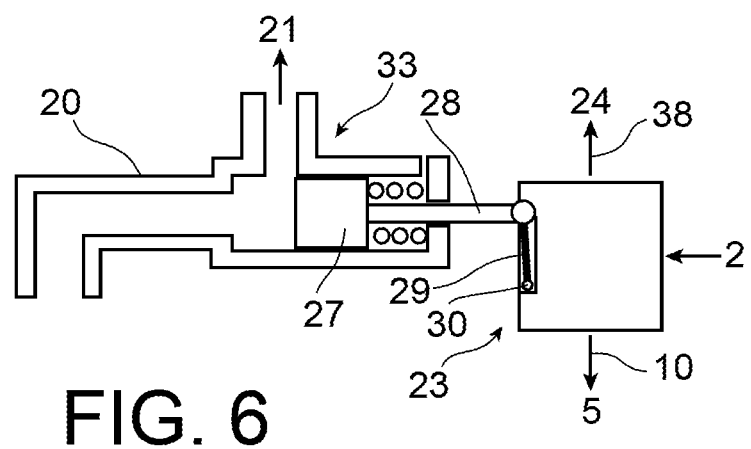

and FIGS. 5 and 6 show a variant embodiment of the invention with two principal operating states.

Figure 1:
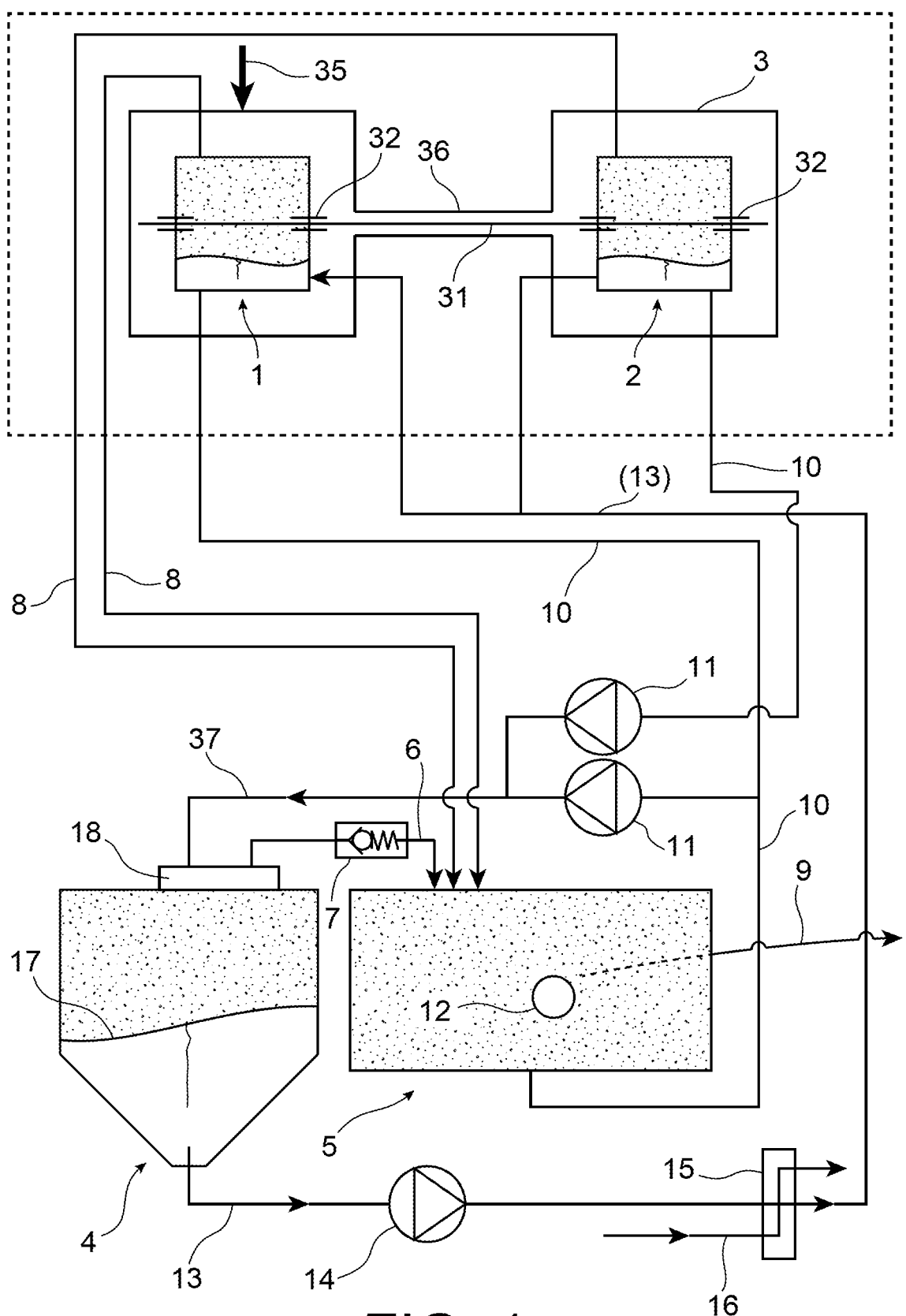
FIG. 1 is an overview of the lubrication circuit.

A lubrication circuit for an aircraft engine can serve a forward principal chamber 1 and an aft principal chamber 2, each containing a support bearing to be lubricated (not shown) of the rotating shaft 31 of the engine; the forward 1 and aft 2 principal chambers are surrounded by dry media of external chambers 3 pressurised by air at a higher pressure than chambers 1 and 2; the main chambers 1 and 2 are delimited at the location at which the rotating shaft 31 passes through their wall to continue in the external chambers 3, by low clearance seals 32 that tolerate a small leak passing through them, for example labyrinth seals, such that the higher pressure in the external chambers 3 can confine lubrication oil in the principal chambers 1 and 2. The compressed air inlet arrives through a conduit 35, for example originating from the engine compressors, that opens up in the forward principal chamber 1, and through a connecting conduit 36 that connects the external chambers to each other. The lubrication circuit also comprises a tank 4 associated with another chamber to be lubricated such as a gearbox 5, the tank 4 possibly being located adjacent to or inside the gearbox. The "first chamber" referred to above can correspond to this gearbox 5 in the embodiment described herein, and the "second chamber" can correspond to other chambers to be lubricated, such as a chamber containing a bearing such as an aft main bearing 2; but the invention is not limited to the configuration described in FIG. 1, and the "first chamber" and the "second chamber" can have different natures or other uses than a bearing chamber or a gearbox; nor does the invention depend on the number of chambers served by the lubrication circuit.

The top of the reservoir 4 is connected to the top of the gearbox 5 through a discharge conduit 6 fitted with a discharge valve 7, that is a non-return valve enabling flows only to the gearbox 5 and that opens up into the tank 4 from an determined overpressure threshold. This discharge valve 7 is used to regulate the pressure in the tank so that it generally remains close to the overpressure threshold.

The tops of the principal chambers 1 and 2 communicate with the top of the gearbox 5 through ventilation conduits 8. Another ventilation conduit, that is an outlet ventilation conduit 9, comes out of the gearbox 5 through a deoiler 12, and leads to the outside. Lubricant recovery conduits 10 connect the bottoms of the principal chambers 1 and 2 and the gearbox 5 to the top of the tank 4, after having converged to form a single conduit 37. A deaerator 18 is located on the single conduit 37 and separates the liquid that it transfers into the tank 4, from the different gases (air and oil vapours) that it sends into the discharge conduit 6. The recovery conduits 10 are provided with recovery pumps 11 forcing the flow to the tank 4. The lubrication circuit also comprises a feed conduit 13 originating from the bottom of the tank 4 and leading to the principal chambers 1 and 2. It is provided with a pump 14 to force the flow in this direction. It passes through a heat exchanger 15 in which the lubricant, heated in service by the energy expended in the bearings, is cooled by another fluid such as engine fuel, transported in a fuel circuit 16 that therefore crosses the lubrication circuit at this heat exchanger 15. During normal service, the supply conduit 13 transports oil (pure or almost pure liquid), the recovery conduits 10 transport a two-phase mixture of oil and air imposed by the high flow chosen for the recovery pumps 11 in order to prevent accumulation of lubricant in the principal chambers 1 and 2, the ventilation conduits 8 transport a two-phase mix of air, oil vapours and oil droplets, the discharge conduit 6 transports a gaseous mixture of air and oil vapours, and the outlet ventilation conduit 9 transports air.

One failure that can occur is as follows; if the heat exchanger 15 is perforated at the fluid separation wall, the fuel transported at a much higher pressure than lubrication oil enters into the supply conduit 13. Therefore a mix of oil and especially fuel enters the principal chambers 1 and 2, with a much higher total flow of liquid than under normal conditions. The recovery pumps 11, designed to transport a large flow of oily air, thus also carry an additional liquid flow in the form of a higher content of droplets in suspension in air or even in the form of a liquid containing air and vapour bubbles. The additional liquid then ends up in the tank 4, therefore the liquid content of which increases continuously since the speed of the supply pump 14 remains unchanged.

During normal operation, the tank 4 contains a volume of oily air above a volume liquid of pure oil above a fairly low interface 17. Since the discharge conduit 6 opens up at the top of the tank 4, the overflow from the tank 4 sent into the gearbox 5 through the discharge conduit 6 when the discharge valve 7 opens, is oily air with a low oil content because the oil is in the vapour state. But when the liquid flow transiting through the recovery conduit 10 becomes excessive, the interface 17 rises in the tank 4 while the deaerator 18 becomes saturated so that air containing liquid droplets (oil and possibly another liquid) can enter the tank 4 and replace air containing only oil vapours above the interface 17. A much larger volume of liquid is then sent to the inside of the gearbox 5. And if the tank 4 is entirely filled with liquid, than it will be ejected as is into the gearbox 5.

Therefore the gearbox 5 gradually fills with liquid in turn, but if a liquid level 19 becomes too high, the deoiler 12 is blocked and air can no longer exit from the gearbox 5 through the outlet ventilation conduit 9. As a result, the pressure in the gearbox 5 and consequently also in the principal chambers 1 and 2 increases; if the pressure becomes higher than the pressure in the external circuits 3, adjusted to an invariable value through a separate circuit, liquid containing oil and therefore possibly fuel escapes and disseminates into the engine, with risks of inflammation.

Figure 2:
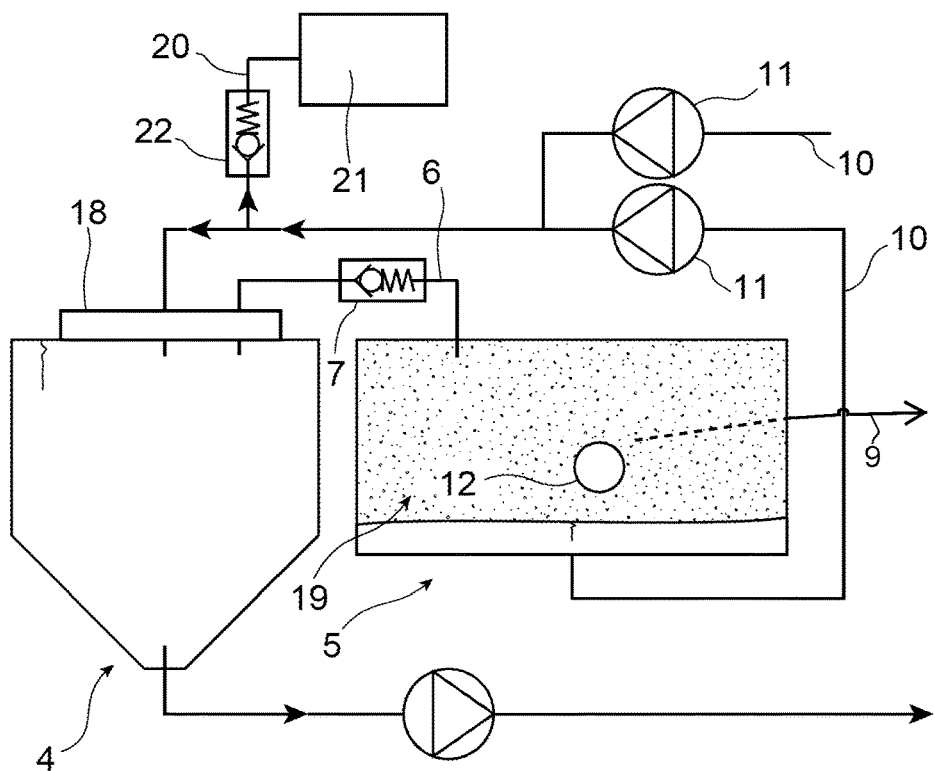
FIG. 2 is a partial view of one embodiment of the invention improving the circuit in FIG. 1.

An evacuation conduit 20 is added to prevent this situation (FIG. 2). It is connected to the recovery conduit 10 on the output side of the pumps 11 and leads to an outlet 21 that, depending on the case, may be the external atmosphere (but in this case excess liquid carried in this evacuation conduit 20 is lost), a recovery tank such as a tank called the ecological tank in which liquid can be stored and recovered, or the aircraft fuel tank if the excess liquid is expected to be composed principally of fuel, so that it is effectively reused during the flight, without the potential problem of a reduction of the aircraft range; in this case, the outlet 21 could also lead into the engine combustion chamber so that the fuel dissipated into the circuit can be used immediately.

The evacuation conduit 20 is fitted with an evacuation valve 22, designed to allow flows only outside the recovery conduit 10, and only when a pressure threshold 10 is reached. In other words, the evacuation valve 22 is designed to open when the liquid pressure in the recovery conduit 10 exceeds a predetermined overpressure threshold. However the pressure in the tank 4 also increases when excess liquid appears in the circuit because the discharge valve 7 imposes a higher pressure loss on the fluid passing through it when it contains liquid droplets. The overpressure is passed on to the recovery conduit 10, which opens the evacuation valve 22, interrupts filling of the tank 4 with liquid and keeps the liquid level 19 in the gearbox 5 at a suitable level. The evacuation valve 22 only closes after a pressure drop in the tank 4, due to the inertia of elements of the system. Ventilation continues under normal conditions because the ventilation conduit is not obstructed; and the principal chambers 1 and 2 remain at a satisfactory pressure.

Figure 3:
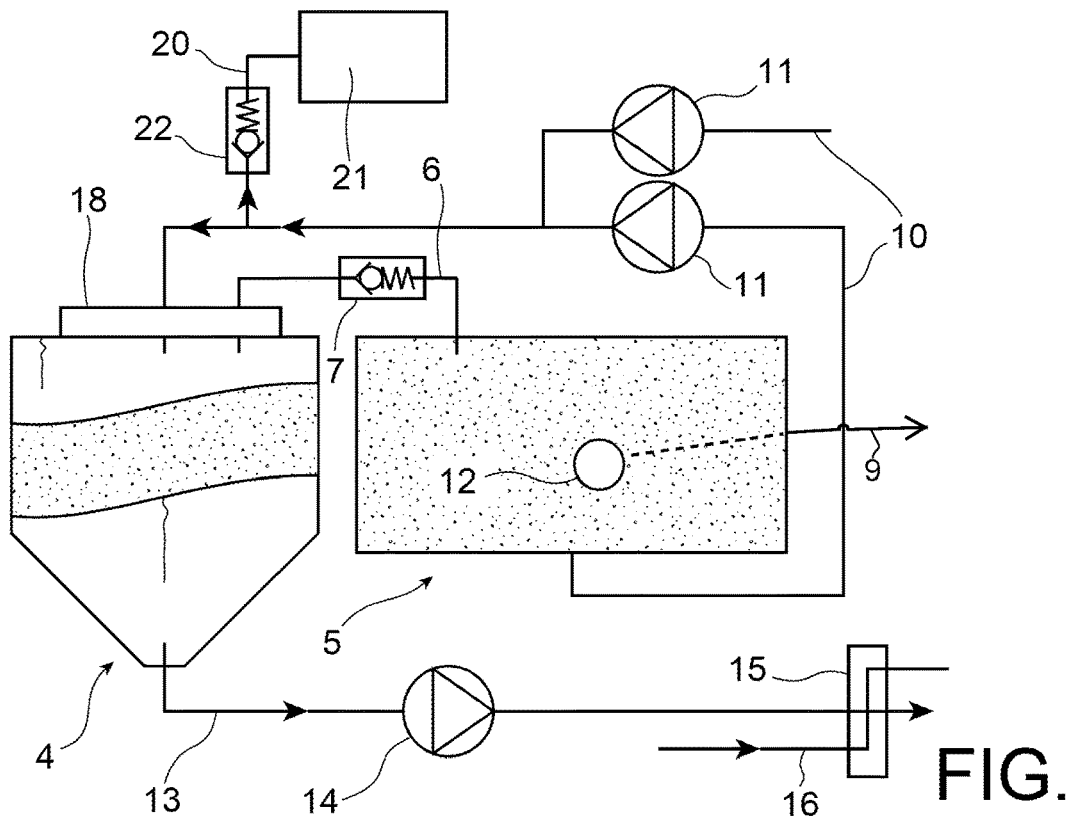
FIG. 3 is a particular state that can be encountered.

One particular advantage of this arrangement arises in a situation (FIG. 3) that can arise in aircraft, namely an inversion of gravity applied to the circuit, as a result of the aircraft flying upside down or when passing through an air pocket. In such a situation, the liquid content in the tank 4 can be projected upwards, with the risk of filling the gearbox 5 and the same consequences as above. However in this case also, the evacuation system will apply a pressure reduction in the chambers due to the pressure increase that will occur in the recovery conduits 10 on the output side of the recovery pumps 11 due to the difficulty in supplying the reservoir 4, the top of which is occupied by liquid. The evacuation valve 22 will then be opened, with the difference that the content that will be discharged through the evacuation conduit 20 will be essentially oily air because the liquid content in the gearbox 5 will also be projected upwards and the recovery conduit 10 will then draw in exclusively gas and oil droplets. The oil loss consecutive to opening of the evacuation valve 22 will then be reduced.

Figure 4:
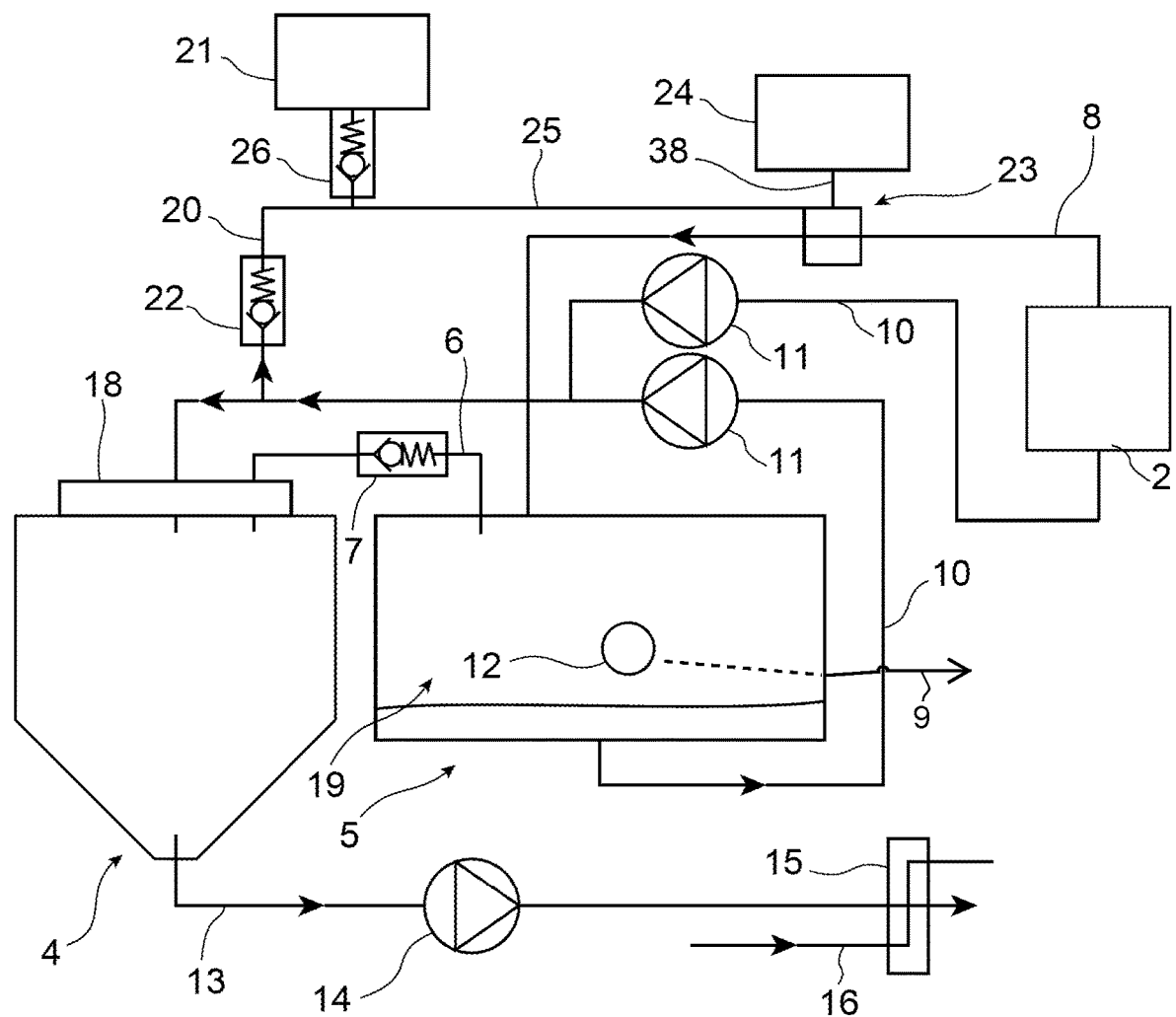
FIG. 4 illustrates an embodiment of the invention.

An improvement to these designs, characteristic of the invention, will be described with reference to the following FIG. 4. An evacuation valve 23, called a two-way valve, is fitted on the ventilation conduit 8 connecting the aft principal chamber 2 to the gearbox 5. The two-way valve 23 orients air containing oil vapours extracted from the aft principal chamber 2 either towards the gearbox 5 during normal operation, or to a discharge 24 (generally to the exterior, but possibly the same as the previous outlet 21)

through a depressurisation conduit 38. And the evacuation conduit 20 comprises a control conduit 25 that leads to the two-way valve 23 to control its state, enabling normal operation in the absence of sufficient pressure in the evacuation conduit 20, and imposing evacuation towards the discharge 24 if this pressure reaches a threshold. A second evacuation valve 26 is left on the evacuation conduit 20 for this purpose, between the connection of the control conduit 25 and the discharge 21. This second evacuation conduit 26 is calibrated to a pressure value slightly lower than the pressure of the first evacuation valve 22, and higher than or equal to the value of the pressure threshold in the control conduit 25 that controls switching of the two-way valve 23. As a result of this arrangement, the gas content in the aft principal chamber 2 is evacuated as soon as a pressure rise is detected in the recovery conduits 10 downstream from the recovery pumps 11, which should even more reliably eliminate the risk of a pressure inversion between the aft principal chamber 2 and the external chamber 3. This arrangement is proposed only for the aft principal chamber 2 because the risk of inverted pressurisation is greater in the aft principal chamber of engines than in the forward principal chamber 1; but it could be applied for any chamber.

A slightly different design will be described with reference to the following FIGS. 5 and 6. The first evacuation valve 22 and the second evacuation valve 26 are integrated into a single device 33 capable of activating the evacuation valve 23, and the control conduit 25 is omitted. The device 33 comprises a piston 27, the rod 28 of which is prolonged by a connecting rod 29, the distal end 30 of which can be displaced along a sufficient movement distance to act on the control mechanism of the valve 23. The piston 27 is pushed by the pressure in the evacuation conduit 20, against the return force of a spring, when a pressure threshold is reached. Below this threshold, the piston 27 interrupts the evacuation conduit 20 and therefore isolates the outlet 21. When the pressure in the evacuation conduit 20 becomes high enough, the piston 27 is pushed back, which opens the evacuation conduit 20 and the access to the outlet 21, while the connecting rod 29 pushed by the valve 23 trips and its distal end 30 is displaced, thus activating the valve 23 to direct the ventilation flow towards the second outlet 24.

With this type of improvement, pressure rises in the principal chambers 1 and 2 become even more unlikely, even if the gearbox 5 is full of liquid, due to the communication set up between the principal chambers 1 and 2 with the second outlet 24, which will be chosen at lower pressure, such as external pressure. The two-way valve 23 can thus be electrically controlled using an independent sensor measuring irruption of fuel or another liquid into the circuit, and integrated into the aircraft FADEC.

The invention claimed is:

1. Lubrication circuit of a first chamber (5) and at least one second chamber (2) for an aircraft engine, the lubrication circuit comprising:
    a lubricant tank (4),
    a discharge conduit (6) from the lubricant tank (4) into the first chamber (5),
    a ventilation conduit (8) connecting the first chamber (5) to the second chamber (2),
    a lubricant recovery conduit (10) connecting the second chamber (2) to the lubricant tank (4) and equipped with a pump (11) forcing a flow towards the lubricant tank (4), and an outlet ventilation conduit (9) connecting the first chamber (5) to a medium external to the circuit, an evacuation conduit (20) connecting to the lubricant recovery conduit (10) between the pump (11) and the lubricant tank (4) and leading to an outlet (21), the evacuation conduit (20) being equipped with a discharge valve (22) preventing backflows to the lubricant recovery conduit and configured to open when the pressure in the lubricant recovery conduit exceeds a predetermined overpressure threshold,
    a control valve (23) on the ventilation conduit (8),
    a depressurization conduit (38) connected to the control valve (23) and leading to a depressurization outlet (24), and
    a valve control conduit (25) originating from the evacuation conduit (20) downstream from the discharge valve (22),
    wherein the control valve (23) is configured to bring the ventilation conduit (8) into communication with the depressurization conduit (38) when a pressure threshold is reached in the valve control conduit (25).

2. Lubrication circuit according to claim 1, wherein the evacuation conduit comprises a second valve (26) between the valve control conduit (25) and the outlet (21), opening at an overpressure less than said overpressure threshold in the lubricant recovery conduit and greater than or equal to the pressure threshold that can control the control valve (23).

3. Lubrication circuit according to claim 1, further comprising a lubricant supply conduit (14) leading from the tank (4) and passing through a heat exchanger (15) through which another fluid passes.

4. Lubrication oil circuit according to claim 3, wherein the outlet leads to a combustion chamber of the engine.

5. Lubrication circuit according to claim 1, wherein the outlet (21) is a recovery tank for excess liquid.

6. Aircraft engine comprising a shaft, a first chamber (5) that is a gearbox, a second chamber (2) that is a chamber containing shaft bearing support blocks, and a lubrication circuit for the first chamber and the second chamber, the lubrication circuit comprising:
    a lubricant tank (4),
    a discharge conduit (6) from the tank (4) into the first chamber (5),
    a ventilation conduit (8) connecting the first chamber (5) to the second chamber (2),
    a lubricant recovery conduit (10) connecting the second chamber (2) to the tank (4) and equipped with a pump (11) forcing a flow towards the tank (4), and an outlet ventilation conduit (9) connecting the first chamber (5) to a medium external to the circuit, an evacuation conduit (20) connecting to the recovery conduit (10; 37) between the pump (11) and the tank (4) and leading to an outlet (21), the evacuation conduit (20) being equipped with a discharge valve (22) preventing backflows to the recovery conduit and configured to open when the pressure in the recovery conduit exceeds a predetermined overpressure threshold,
    a control valve (23) on the ventilation conduit (8),
    a depressurisation conduit (38) connected to the control valve (23) and leading to a depressurisation outlet (24), and
    a valve control conduit (25) originating from the evacuation conduit downstream from the discharge valve (22),
    wherein the valve is configured to bring the ventilation conduit (8) into communication with the depressurisation conduit (38) when a pressure threshold is reached in the control conduit.

7. Aircraft engine according to claim 6, the lubrication circuit comprising a supply circuit (14) for lubricant originating from the tank (4) and passing through a heat exchanger (15) through which another fluid passes, in which the other fluid is fuel transported in a circuit (16) crossing the lubrication circuit at the heat exchanger (15).

8. Aircraft engine according to claim 7, wherein the evacuation outlet (21) is a fuel tank of the aircraft.

\* \* \* \* \*